United States Patent [19]

Szekely

[11] 4,147,590

[45] Apr. 3, 1979

[54] NUCLEAR PROPULSION APPARATUS WITH ALTERNATE REACTOR SEGMENTS

[75] Inventor: Thomas Szekely, Santa Monica, Calif.

[73] Assignee: The United States of America as represented by the United States Department of Energy, Washington, D.C.

[21] Appl. No.: 484,488

[22] Filed: Sep. 1, 1965

[51] Int. Cl.² .............................................. G21D 1/00
[52] U.S. Cl. .................................. 176/39; 176/86 R; 176/DIG. 3; 60/203
[58] Field of Search ....................... 176/39, 59, 60, 65, 176/DIG. 3, 86 R; 60/203

Primary Examiner—Peter A. Nelson
Attorney, Agent, or Firm—Dean E. Carlson; Leonard Belkin

EXEMPLARY CLAIM

1. Nuclear propulsion apparatus comprising:
   a. means for compressing incoming air;
   b. nuclear fission reactor means for heating said air;
   c. means for expanding a portion of the heated air to drive said compressing means;
   d. said nuclear fission reactor means being divided into a plurality of radially extending segments;
   e. means for directing a portion of the compressed air for heating through alternate segments of said reactor means and another portion of the compressed air for heating through the remaining segments of said reactor means; and
   f. means for further expanding the heated air from said drive means and the remaining heated air from said reactor means through nozzle means to effect reactive thrust on said apparatus.

12 Claims, 13 Drawing Figures

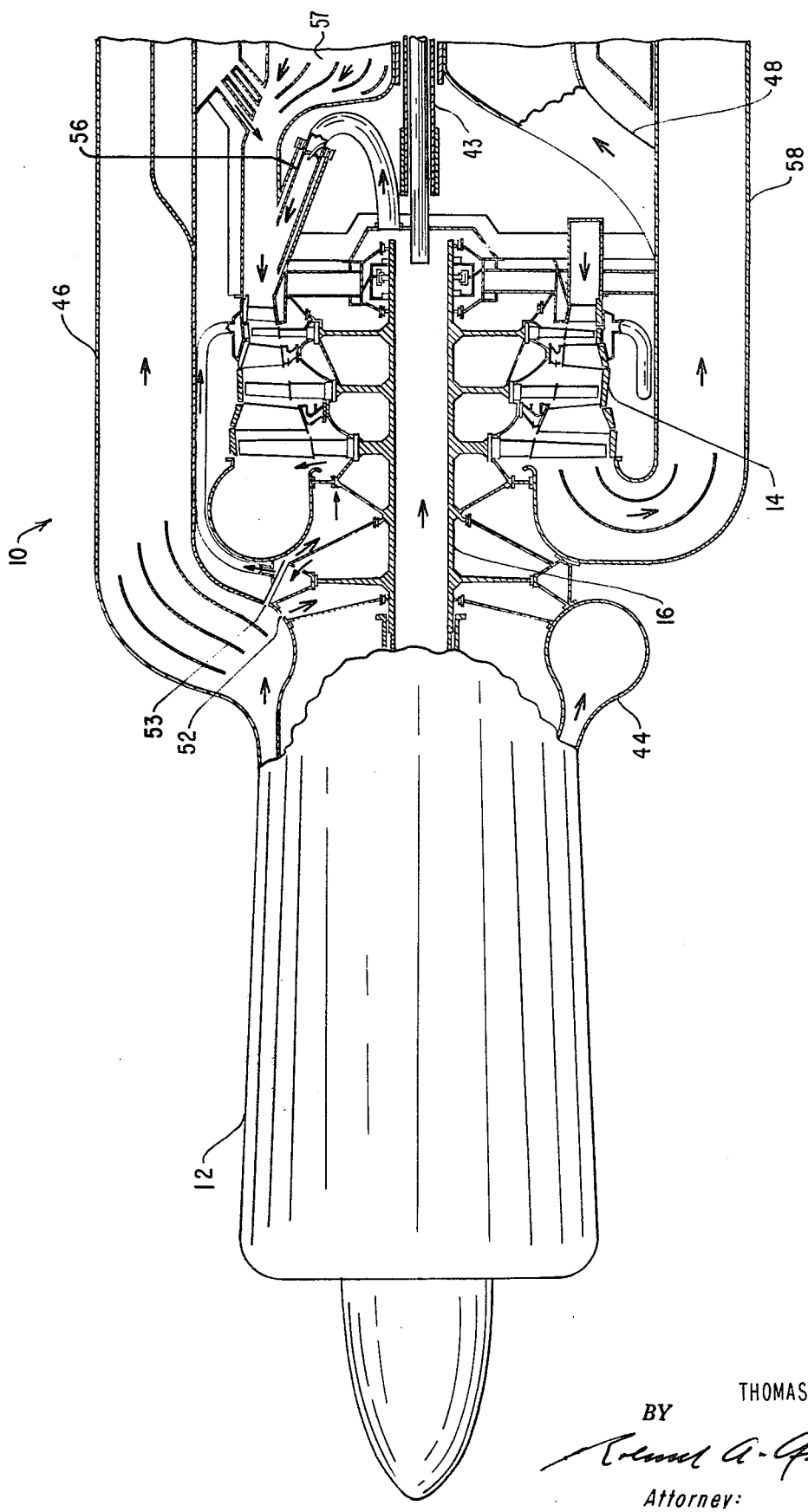

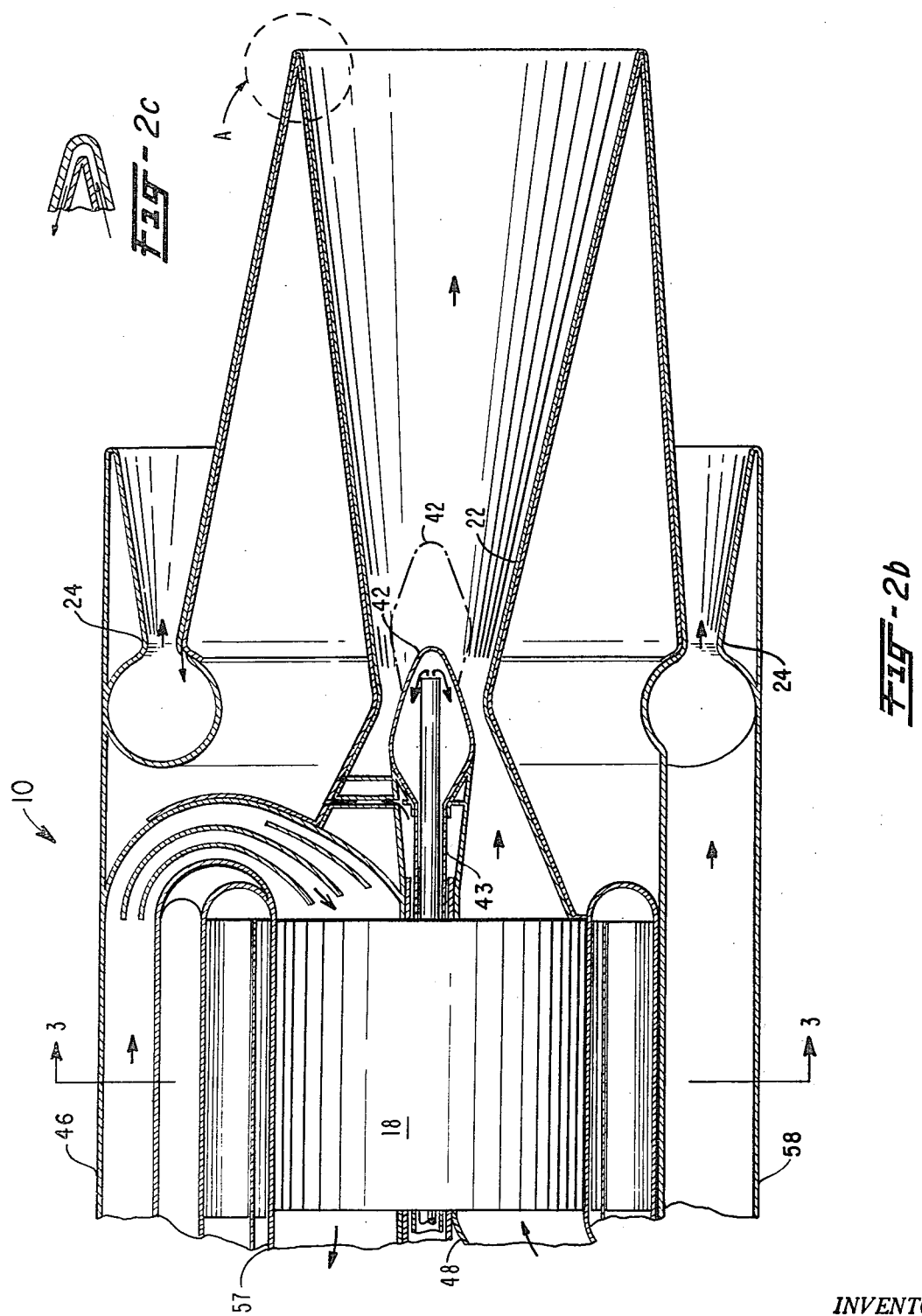

BORON INSERTS

INVENTOR.
THOMAS SZEKELY
BY
Attorney:

INVENTOR.
THOMAS SZEKELY
BY
Attorney:

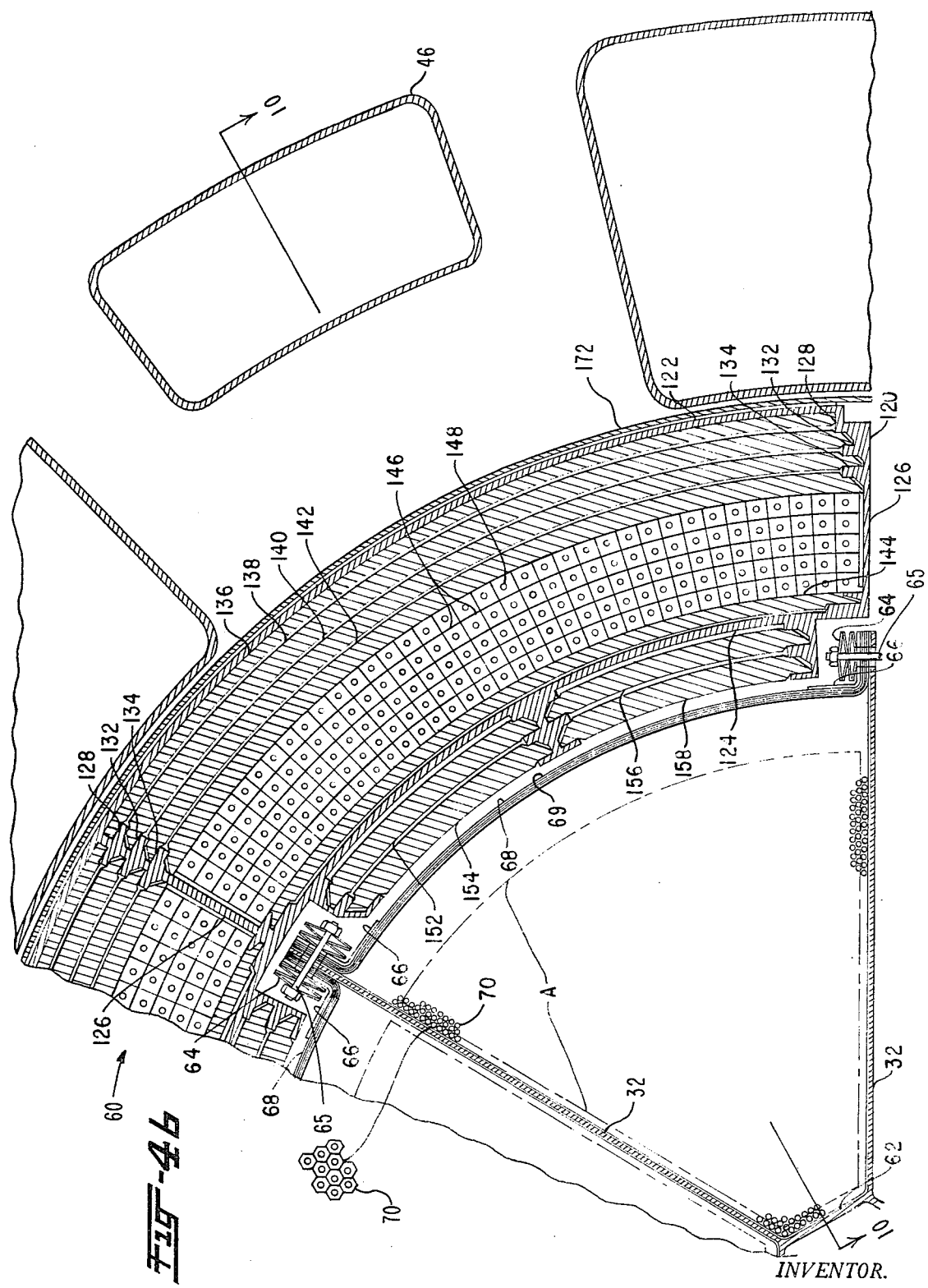

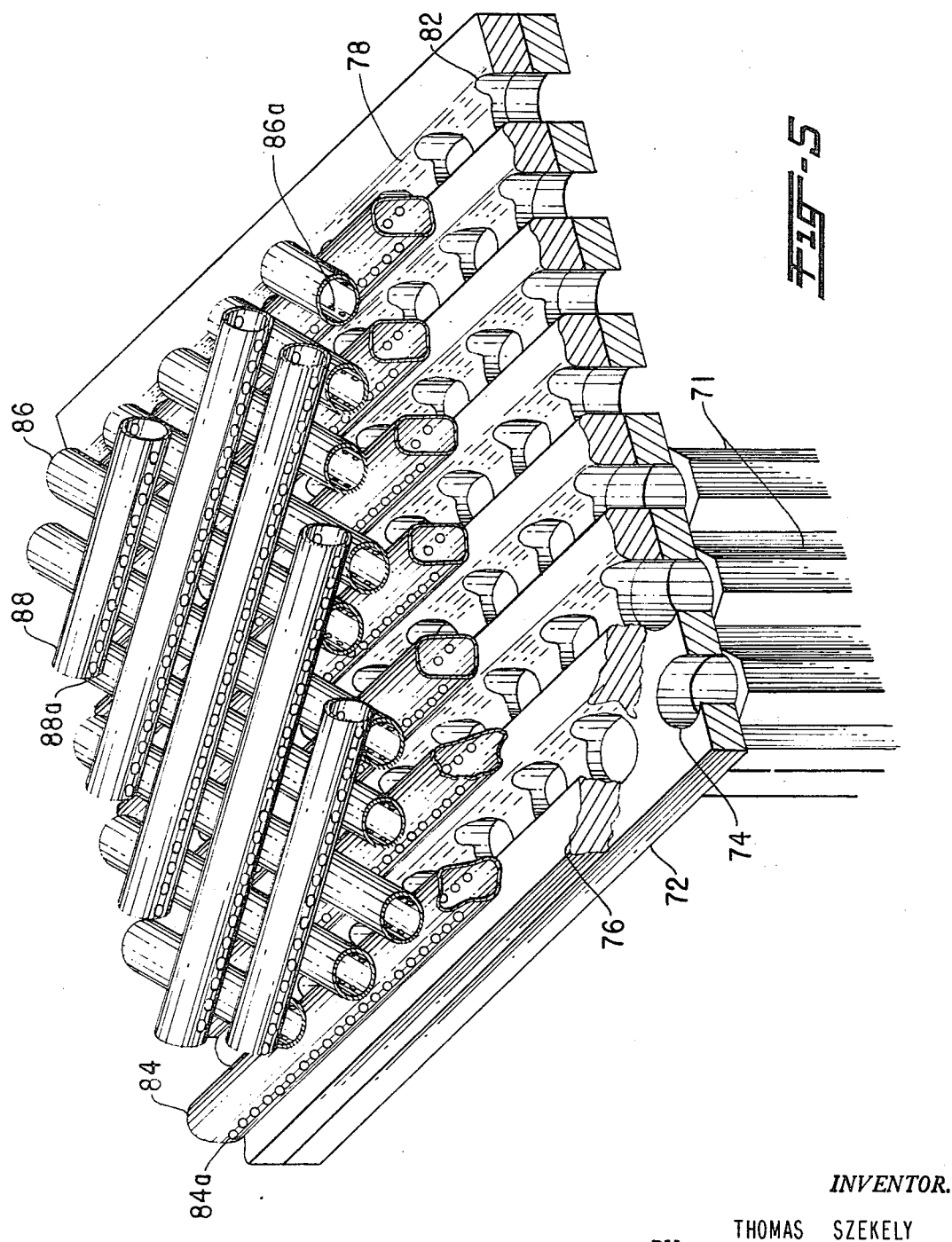

INVENTOR.
THOMAS SZEKELY
BY
Attorney:

NUCLEAR PROPULSION APPARATUS WITH ALTERNATE REACTOR SEGMENTS

This invention relates to nuclear propulsion apparatus and more particularly to nuclear propulsion apparatus utilizing a fast nuclear fission reactor as a source of heat in a turbojet engine.

It has long been the desire of workers in the fields of modern aircraft jet engines and nuclear power to find some practical way of combining a nuclear power source with jet propulsion apparatus to make most effective use of both techniques and bring about a practical application of these areas of technology.

Efforts have been made in the past to design turbojet engines which utilize nuclear fission reactors in the place of the combustion chamber as a source of heat. Unfortunately, these efforts have resulted in designs in which the engines were excessively heavy or occupied excessive volumes, especially when it came to meeting shielding requirements, and in which the control systems did not have the degree of reliability which one would like to have in aircraft engines. A variety of other problems, as well, have not heretofore been adequately dealt with in prior designs, so that efforts have been continuing to obtain a safe, reliable economic and practical system combining the turbojet and the nuclear power source.

The present invention overcomes many of these difficulties to an extent not heretofore obtainable nor believed by some to be realizable in the present state of the art. By combining a counterflow type of turbojet power plant utilizing a partial by-pass of the turbine to make use of recently developed high temperature materials, and combining in unique fashion an improved fast reactor design embodying special core and support arrangement it has been made possible by this invention to obtain a nuclear powered jet propulsion apparatus of reduced weight and volume, increased reliability and economy, and capable of increased length of lift and safety.

It is thus a first object of this invention to provide a turbojet engine utilizing a nuclear power source.

It is another object of this invention to provide an improved turbojet engine using a nuclear fission reactor of reduced weight and volume.

A further object is an improved support arrangement for a compact fast-neutron reactor.

It is a further object of this invention to provide an improved cooling arrangement for a fast reactor designed for use in aircraft propulsion apparatus.

Still another object of this invention is compact nuclear propulsion apparatus of improved reliability and safety.

Other objects and advantages of this invention will hereinafter become more obvious from the following description of a preferred embodiment of this invention taken with reference to the accompanying drawings in which:

FIGS. 2a and 2b illustrate a side view assembly, in section, of the preferred embodiment of this invention;

FIG. 2c is an expanded view of detail A in FIG. 2b;

FIG. 4b is a detail of a reactor sextant shown in FIG. 3;

FIG. 5 is a detail of the rear end structure of the nuclear reactor;

Figure 1:
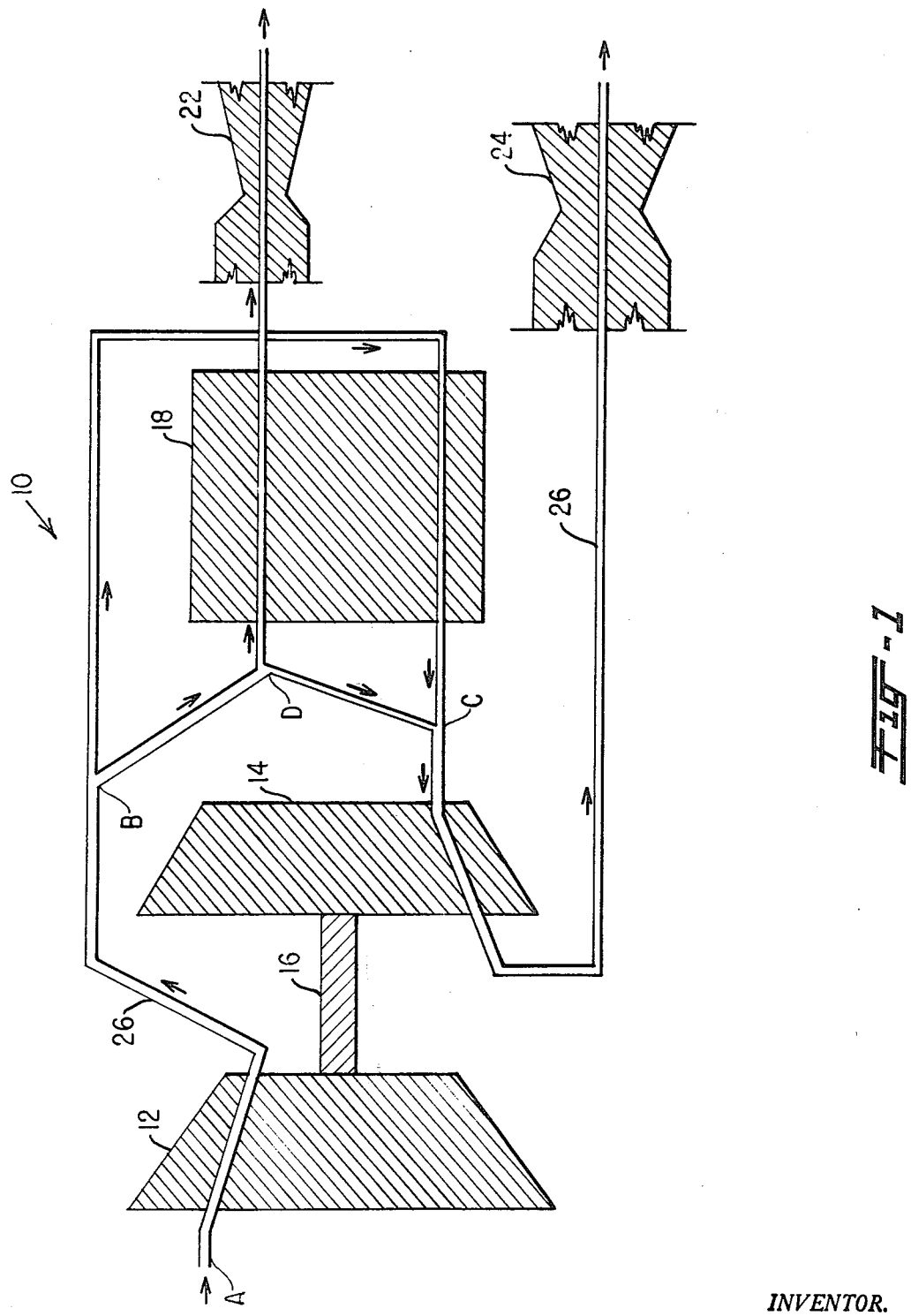
FIG. 1 is a flow diagram illustrating the cycle of the preferred embodiment of this invention.
Figure 3:
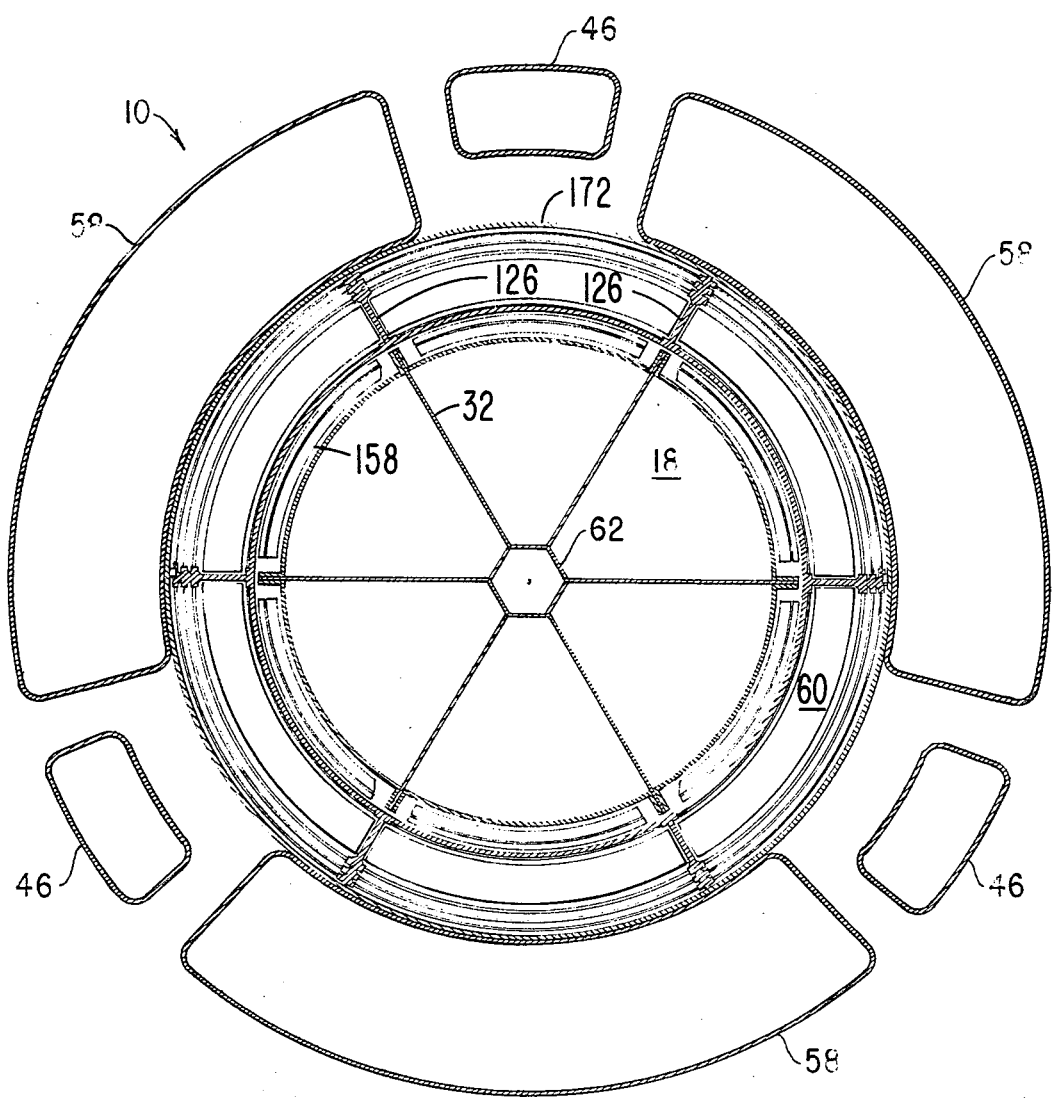
FIG. 3 is a view along 3—3 of FIG. 2b.

Referring to FIG. 1, there is shown the basic functional elements comprising a preferred embodiment of this invention. Power plant 10 consists of a compressor 12 and a turbine 14 mounted on a shaft 16, a nuclear fission reactor 18 for the source of heat, an inner nozzle 22, and a concentric outer nozzle 24.

As indicated by flow line 26 provided with arrows to indicate direction of flow, air enters compressor 12 at A and is raised to a suitably high pressure. The compressed air at B is divided into two paths. In the first path, the compressed air passes through reactor 18 for heating in the forward direction and is recombined at C with the main flow stream. In the second path of flow from point B, the air under compression is divided at point D where some of the air passes through reactor 18 in a rearward direction for heating and is exhausted through inner nozzle 22 and the remaining compressed air is recombined at point C with the air heated in reactor 18 flowing in a forward direction. From point C the heated, compressed air is partially expanded in turbine 14 to drive compressor 12 and the other auxiliaries (not shown) of the power plant, the partially expanded air then being expanded and exhausted through concentric outer nozzle 24.

In the arrangement just described it will be seen that the nuclear turbojet cycle is a balanced counterflow cycle. As will be seen later reactor 18 is divided into six equal segments, three of which carry forward-directed air and the remaining carrying rearward-directed air. Reactor 18 is thus balanced which results in minimum stress-temperature conditions. An unbalanced system in which the flow in one direction may exceed that of the opposite direction through the reactor may be used to obtain certain specific performance characteristics.

The air entering turbine 14 is cooled to a value compatible with materials available for turbine operation. However, the rearwardly directed reactor flow discharges at very high temperature and high pressure into inner nozzle 22. In this nozzle, all of the energy of the rearward flowing fluid is released and most of the final propulsive thrust is derived from this part of the power plant where the highest cycle combination of pressure and temperature prevails. This arrangement is capable of producing considerable thrust at even zero flight speed.

Referring to FIGS. 2a, 2b, 2c, and 3 for the details of the assembly comprising powerplant 10, there is illustrated axial flow compressor 12 and turbine 14 mounted on hollow shaft 16. Nuclear reactor 18 is located downstream from turbine 14 and is axially aligned with shaft 16. Inner nozzle 22 is located on the central axis of the power plant and is located immediately downstream of reactor 18. Outer nozzle 24 is annular in construction, surrounding inner nozzle 22. As shown in FIG. 2c, these nozzles are double-walled with a space between to permit flow of cooling air indicated by arrows. In the embodiment illustrated, inner nozzle 22 is controllable by a nozzle plug 42 which is adjustable by a drive shaft 43 as is understood in the art to regulate the nozzle throat area. While not shown, outer nozzle 24 may be similarly provided with an annular throat plug for adjusting its throat area, or may be constructed so that one of the annular nozzle walls can be moved axially relative to the other to obtain an adjustable throat area.

The output of compressor 12 is discharged into compressor discharge toroid collector 44 from whence a portion of the compressed air is passed by way of compressor discharge duct 46 to the aft end of the reactor 18 and the remaining portion of the compressed air going by way of a transition duct 48 from duct 46 to the forward end of reactor 18 for flow rearwardly through the reactor. There are actually three transition ducts 48, each connected to a discharge duct 46. Small amounts of air are tapped at openings 52 and 53 for use as cooling and pressure balancing of the elements on shaft 16 as is understood in the art. Some of the air passing through hollow shaft 16 is passed through a chemical interburner 56 and discharged into turbine 14. The purpose of interburner 56 is to burn a chemical fuel to obtain additional power for short periods when required, such as at take-off and for providing rotor operation and airflow to cool the reactor after landing.

The heated air passing rearwardly through reactor 18 exits through inner nozzle 22 while the heated air passing in a forward direction through reactor 18 passes through ducts 57 and is partially expanded in turbine 14 and then passed by way of turbine discharge duct 58 to concentric outer nozzle 24.

Some of the important features of the powerplant design just described include the use of ducting farthest away from the axis of the apparatus so as to permit shielding of reactor 18 to be accomplished within the ducting at a minimum use of weight. In addition, the counterflow arrangement isolates compressor 12 and shaft 16 from reactor 18 to provide some additional degree of thermal insulation. There is small differential thermal growth between the outside longitudinal compressor discharge ducts 46 and turbine discharge ducts 58 as these ducts carry air at substantially the same temperature. For example, in the embodiment described, a typical compressor discharge temperature is 1190° F. and turbine discharge air is 1203° F. during flight at design-point conditions. There is also minimum ducting for hot flow, the hot flow ducts being straight short sections located only at the front end of reactor 18 to conduct reactor discharge air mixed with cool air into turbine 14 and short ducting as well at the reactor rear end to conduct heated air into nozzle 22. It will also be seen from the arrows shown that there is provision to air-cool the central longitudinal passages in reactor 18 and control plug 42; the interior of the latter and interior surface of the entire hot inner nozzle 22 being washed with this same cooling air which then dumps into outer jet nozzle 24.

Figure 4A:
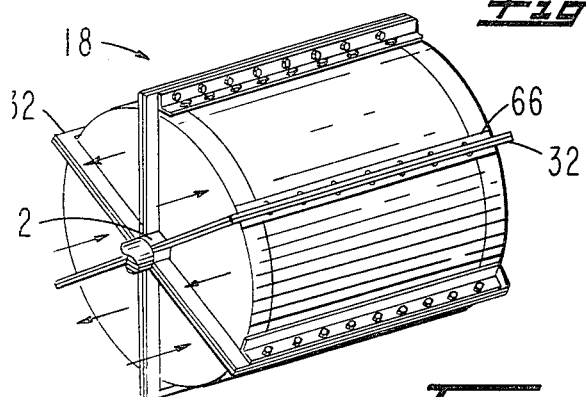
FIG. 4a is a schematic of the reactor shown in side views by FIGS. 2a and 2b.

Reactor 18 has a right circular cylindrical shape and is divided into six wedge-shaped segments or sextants, the forward-directed and rearward-directed flow passing through alternate equal-sized segments as indicated by arrows, as shown schematically in FIG. 4a. FIG. 4b shows a sextant of reactor 18. For an unbalanced system these segments would not be of equal sizes; three equal sized smaller segments would be alternately positioned between three equal sized larger segments. Reactor 18 is supported centrally along its longitudinal axis by a hollow hub 62 that is fastened at each end to the external power plant frame. Hub 62 has six radial webs 32 that extend from hub 62 to the outer periphery of the reactor cylinder, these longitudinal webs 32 providing the walls between the six sectors or segments.

Reactor 18 which is surrounded by a shielding arrangement 60 to be described later, is also designed with a novel endoskeleton structure to provide support at the longitudinal centerline with freedom for thermally caused radial growth. This internal support structure consists of the hollow hexagonal hub 62 with the six evenly spaced radial webs 32 extending to the outermost periphery of reactor 18 where clamping arrangements consist of spring assemblies 64 and hold angles 66 which in turn support the ends of curved segments 68 which then assembled as shown in FIG. 4b. form the core pressure vessel 69 of reactor 18 divided into six segments. Each segment contains extended, hollow hexagonal ceramic tubes 70, those being within phantom line A being fueled and those being outside of the phantom line being unfueled. The unfueled tubes in the annulus between phantom line A and core pressure vessel 69 provide neutron reflection and thermal insulation between hot core tubes 70 and core pressure vessel 69. The unfueled tubes between phantom line A and web 32 and between phantom line A and hub 62 provide thermal insulation between the hot core tubes and the metallic endoskeleton reactor support structure.

A suitable material for fueled tubes 70 would be rhombohedral phase $UO_{2.9}.3Y_2O_3$ with 93.5% enrichment in the U-235 isotope. Typical dimensions for hollow hexagonal tubes 70 would be 0.150 inch inside diameter and 0.200 inch across hex flats. Length of tubes 70 would be 4 to 8 inches. If desired, uranium with a higher enrichment in the $U^{235}$ isotope may also be used as the fuel for tubes 70; also the $U^{233}$ isotope may be used. To reduce the fuel element materials thermal stresses the material thermal conductivity may be increased by impregnating it with refractory metal alloy fibers, that have compatible thermal expansion coefficients and other properties such as chemical non-reactivity at temperature. For example, chemically inert platinum fibers may be used at temperatures up to 3000° F., and providing they are not surface exposed for oxidation with the hot air, tungsten-rhenium alloy fibers may be used for even higher operating temperatures.

As seen from the preceding description of vessel 69 containing the fuel of reactor 18, the outer wall of the pressure vessel 69 is designed in thin layers previously referred to as curved segments 68 to provide the flexibility necessary to maintain circle-arc geometry when the radius increases as a result of thermal growth. In the preferred embodiment, the multilayered pressure vessel is ¼-inch thick. This thickness provides for tensile (hoop) stresses. Tangentially acting compression springs within spring assemblies 64 applied longitudinally at the six even outermost radial parts of the reactor hold the six parts of reactor pressure vessel 69 together. Spring tie-bolts 65 are provided through the structure of web 32 and hold angles 66; and to permit longitudinal differential thermal growth the radially directed ends of multi-layered pressure vessel components 69 are provided with mating but longitudinally elongated holes (slots). During operation, with increasing temperature, radial thermal growth of the reactor increases spring compression in assembly 64 and also increases the circumferential gaps between the protruding webs 32 and the adjacent radially aligned sections of vessel 69. The reaction force from the added spring compression is passed as added tensile force to multilayered pressure vessel 69 that flexes uniformly into a circle arc with increased radius, and the added force is transmitted as an increased radial pressure on the reactor fuel tubes 70. The spring force in each assembly 64 would be adjusted during reactor assembly to a minimum but sufficient restraining value when reactor 18 is cold.

This described reactor support structure has many advantages over a structure that uses concentric support rings or radially acting compression springs with contact at pressure pads mounted on the outside of a reactor pressure vessel. One of the advantages derives from the effect of reactor size on "hydraulic" pressure transmitted radially to the fueled tubes assuming lack of friction and idealized fluid-type behaviour for the ceramic fuel elements. A fueled tube in a large assembly has a greater compression load than one in a small assembly, particularly if the tube is at the bottom of the reactor; and because the preferred embodiment divides the reactor into several smaller volumes, the radial pressure on the fueled tubes is accordingly reduced and the compressive loads on the tubes at the bottom of the reactor are reduced. This static load advantage is further pronounced when pressure is increased because of thermal growth; and in the divided system of this invention the thermal growth in a given compartment is independent of the growth of the outer compartments and the added "hydraulic" pressure caused by thermal growth is less than in the large single-compartment of the conventional reactor configuration. For this same reason, an unmoderated reactor (assuming an undivided volume) has less compressive load imposed on fueled tubes than a thermal reactor because the unmoderated reactor is smaller. Hence, the fueled tubes in this reactor are treated to the double advantage of containment in a reduced size unmoderated reactor and containment in compartments that are only 1/6 of the total reactor volume.

Although reactor 18 has virtually no end loads for the support structure to transmit to the power plant frame because it has balanced counterflow of the air therethrough, there is an end load for each of the six flow compartments caused by the pressure differential between the front and rear ends of the compartments; this pressure differential is caused by friction drag and momentum acceleration of the air due to heating in the ceramic fuel tubes.

A special feature of this reactor is thus the design of the end support structure to retain the stacked ceramic tubes 70 that are about 3000° F. temperature in the fueled core region. The problem is first reduced by the circumferential division of reactor 18 into six equal parts; the end support structure is thus required to span a much smaller end area since the end area per support structure is 1/6 of the reactor end area. During operation at design-point conditions of the preferred embodiment, the total load on the end-support structure for each compartment is accordingly reduced to about 10,500 lbs. and the average stress is approximately 95 psi, which of course is still a considerable problem to be dealt with.

Figure 6:
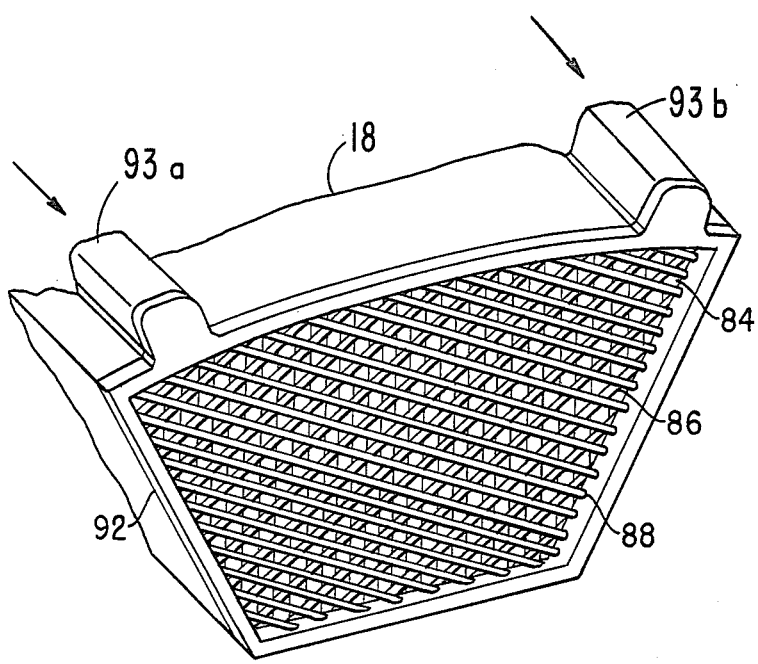
FIG. 6 shows the end of a typical reactor compartment with the assembled end structure.

In accordance with this invention, as illustrated in FIG. 5, a tube-lattice end structure is provided consisting of three banks of metallic support tubes, as follows. The ends of hexagonal fueled tubes (not shown) are supported axially by unfueled ceramic transition tubes 71 (to be described later) that are in turn provided with a ceramic back-up plate 72 having openings 74 aligned with the outlets of transition tubes 71. Integral with ceramic back-up plate 72 is ceramic transition pad 76 having a series of slots 78 and openings 82 similarly aligned, and then successive rows of metallic support tubes 84, 86 and 88 in a lattice array as illustrated, the first row of tubes 84 being parallel with slots 78 and located in recessed pads that are raised between the slots, leaving room for the exiting air to be distributed more or less uniformly throughout the lattice arrangement of tubes. Each of the metallic support tubes is provided with openings 84a, 86a, and 88a, respectively, for a purpose to be described below. As illustrated in FIG. 6, the end of each segment of reactor 18 is provided with a frame 92 which supports the ends of the various plates and metallic support tubes just described. A pair of tubes 93a and 93b carry unheated air from compressor 12 by-passing reactor 18 to metallic support tubes 84, 86 and 88 as indicated by the arrows to help cool the boundary layer of the air exiting from the fueled tubes, this air becoming mixed with the highly heated reactor core discharge air after it leaves the openings 84a, 86a, and 88a in the respective tubes. The coolant air passes through these holes perpendicular to the reactor airflow and is then washed downstream with the hot reactor airflow. As the coolant air is washed downstream, it mixes with the hot reactor discharge air, but the mixing is not completed before the cooling air has passed beyond the grid structure; a thin boundary layer of cool air persists, and this film will bend to follow the contours of the outside wall of any metallic tube in the grid to meet a like film of cool air contoured from the opposite side of the metallic tube after discharge from the holes on that side. The outsides of the metallic tubes in the grid structure are therefore film-cooled and thermally insulated from the hot reactor discharge air by the same cooling air that passes through the openings in the metallic tubes. The three banks of tubes aligned at 60 degrees with each other and intersecting at uniform intervals at points between the discharging jets of hot air prevent any blockage of air flow.

Figure 7:
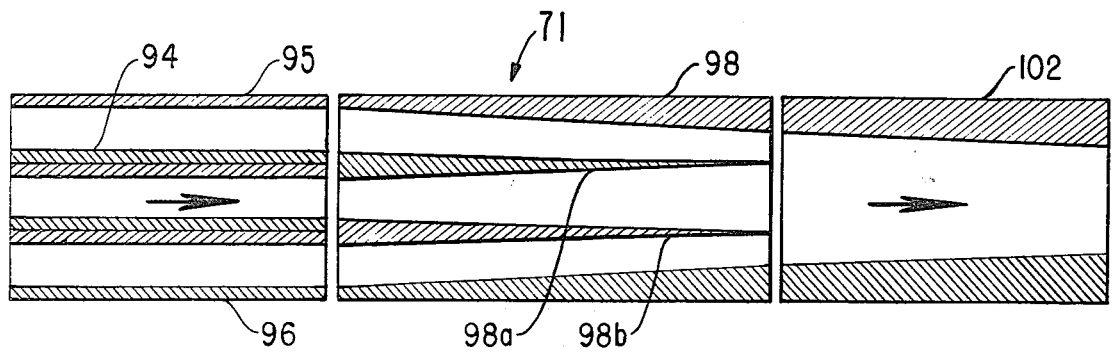
FIG. 7 shows a cross section of the flow channel transition assembly for the downstream ends of seven typical hexagonal reactor tubes (a unit cell)

The purpose of transition pieces 71 mentioned above is to further insure that the support structure just described does not become overheated as a result of the close proximity to the fueled tubes, and to permit the use of larger diameter metallic support tubes without interfering with the hot discharge flow from the reactor end. Referring to FIG. 7, it will be seen that transition pieces 71 consist of a three section ceramic (i.e. yttria) reflector-insulator tube assembly now to be described for each unit cell of seven hexagonal fueled tubes 70. One 7-hole unfueled ceramic reflector-insulator transition section 95 is aligned with a group of seven fueled tubes 70 (a unit cell, not shown); then a second transition section 98 is utilized having longitudinally tapered inner walls 98a to combine the hot air flow from the seven inlet holes, and finally a third transition section 102 is provided to produce a single channel flow of hot air having the same cross-sectional flow area as the sum of the flow areas for seven upstream fuel tubes 70. Additional transition assemblies may be provided to arrive at an increased width for the intercellular wall strips that span the honeycombed reactor end face to accommodate perpendicularly aligned metallic end support tubes that have sufficiently large enough diameters as required to carry the reactors sextant end load.

Additional temperature aspects of the end-support structure may be handled by using yttria ceramic tubes as a thermal insulator (and end neutron reflector as well), sandwiched between the fueled tubes and first transition section of the end support structure. These yttria tubes would be radially sized the same as the fueled tubes to provide continuous in-line passages for the hot airflow. This insulating slab of yttria tubes would reduce the longitudinal conduction of heat to the end-support structure.

Figure 8:
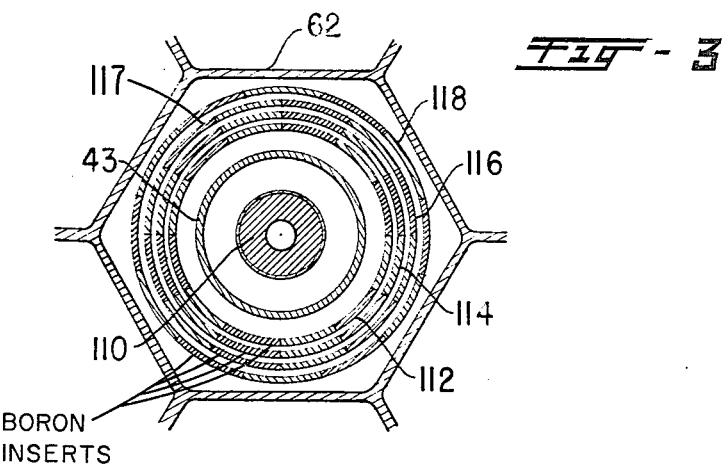
FIG. 8 is a detail of the central portion of FIG. 3.
Figure 9:
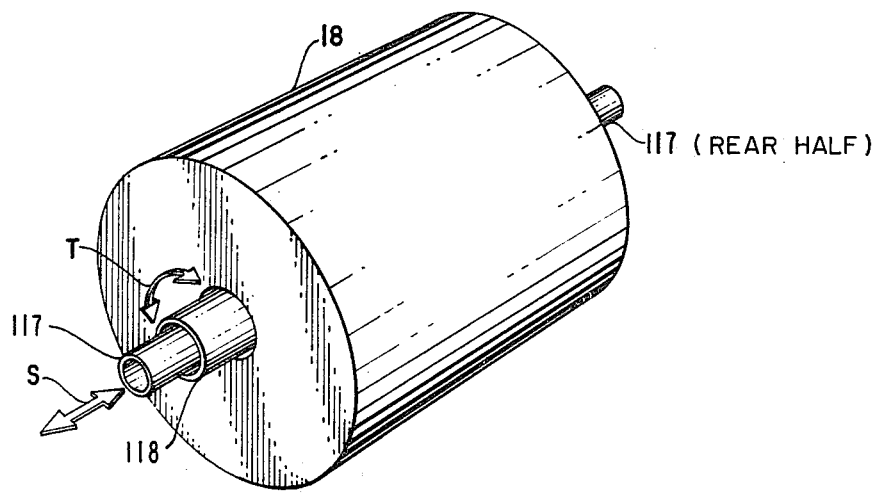
FIG. 9 illustrates schematically the control arrangement for the reactor.

A suitable control system for reactor 18 is illustrated in FIGS. 8 and 9. In FIG. 8 is shown drive shaft 43 for nozzle plug 42, within which is a hollow boron containing scram control rod 110, and around which are a plurality of front half and rear half pairs of shim cylinders 112, 114 and 116 which comprise shim control cylinder assembly 117, and an outer dynamic control cylinder 118, all in a concentric relationship. Each of the shim and dynamic cylinders just mentioned are provided as shown with inserted sections along the circumference consisting of suitable neutron poison material such as boron. In FIG. 9 is shown schematically reactor 18, outer dynamic cylinder 118 and shim cylinder assembly 117. Each of shim cylinder 112, 114 and 116 may be rotationally adjusted reactor checkout and the front and rear halves of shim cylinder assembly 117 are moveable axially as indicated by double-headed arrows S in FIG. 9 to effect the control of reactor 18 during operation. Dynamic cylinder 118 is moveable rotationally as indicated by arrow T to effect the control of reactor 18.

The typical characteristic of a nearly constant but somewhat centrally peaked radial power distribution and a centrally peaked longitudinally power distribution is usefully employed in the controlling of this fast spectrum reactor where it is important to satisfy the demands for simplicity and reliability. As shown in FIGS. 8 and 9 the entire control system is located as a single assembly along the centerline of reactor 18 and within the "island" hexagonal support structure or tube 62. This control location affects the radial power distribution to yield a more uniform profile of radial power distribution by reducing the central peaking. Conversely, the central location is ideal for control as the reactivity worth is the greatest in the radial and longitudinal center of the reactor. The control system is limited to the use of only three moving parts, none of which is located in the high-temperature region of the reactor but where a maximum "worth" is obtained to effect changes in reactivity with a minimum of absorber material, mechanical motion, and driving power. Compared to a currently popular propulsion reactor control system that uses a number of parallel-to-core reflector-contained control drums, this central control system provides better volumetric utilization that affects a reduction in shield weight because the control system frontal area is reduced and the same thickness of concentric-to-reactor shield cylinder has a reduced diameter. Also, using a large number of absorber rods that are inserted axially into core-face openings for control as in other proposed arrangements, the central control system of this invention offers movement without the probability of sticking or binding that has been experienced with the small absorber rods as they are moved axially in the hot reactor core.

Shim control, for gross reactivity change, is obtained through the opposed axial movement of the front and rear halves of shim cylinder assembly 117 that contains boron-10 longitudinal inserts along its entire length. Six inserts are used in the front and rear half of each of the three concentric shim cylinders 112, 114 and 116 that are rotationally adjustable (during assembly only) and are then locked together to travel longitudinally as one cylinder half of assembly 117 as shown in FIG. 9. Motion would be obtained through a simple arrangement of pulleys and tension cables or other electromechanical linkage (not shown) and not forming a part of this invention. Each shim cylinder assembly half is pulled into or out of the core with cables attached at each end of the cylinder and routed over pulleys (that are outside of the reactor) to a drive motor located away from the reactor. Chain may be used to replace part of the cable passing through the drive motor or may be used altogether in lieu of the cables.

Dynamic control, for fine changes in reactivity, is obtained through partial rotation of the outer (dynamic) control cylinder 118 that is concentric with the shim cylinders and also lined throughout its length with longitudinal inserts of boron-10. Rotation of the dynamic control cylinder 118 alters the radial alignment of the boron inserts between the inner (shim) and outer (dynamic) cylinders to yield a fine change in reactivity. Rotation of dynamic cylinder 118 would be obtained through a worm and gear arrangement and a drive motor located remotely from the reactor (not shown and not forming a part of this invention). This partial rotation of a cylinder (to alter the radial alignment of the boron inserts) yields considerable resolution without elaborate mechanical linkage because of large movement is used to obtain a small change in reactivity. In lieu of the worm and gear assembly, large movement may also be obtained by attaching a radial arm (not shown) to dynamic cylinder 118 at the front end of the reactor; this arm would extend radially beyond the reactor (between duct walls) where a drive system would move the arm over a large tangential distance (to obtain a small amount of rotation in the dynamic cylinder). A special advantage of this control system design is thus its effectiveness in using both a variable absorber area and a neutron trap effect to control unmoderated fast-neutron-spectrum reactor 18. Considerable variation in reactivity is made available through the large surface area and small thickness of absorber poison (boron-10) presented by the control cylinders, which acts to reduce the self-shielding of the absorber and to increase the reactivity change available per unit volume of control material over that available in a lumped system such as one with a number of small control rods. In addition, a neutron trap effect is produced, so that fast neutrons from the reactor pass through the thermal absorber poison in the control cylinders, are degraded in energy by inelastic scattering within the control cylinders, and are absorbed in greater numbers (because of their lower energy) while passing radially out through the control cylinder absorber material. Also highly effective in control are the opposed axial movement of the two halves of the shim control cylinders to add or remove absorber material at the center of the core where the worth is high and gross effect is obtained, and the relative rotational movement of the radially separated longitudinal inserts of boron absorber in the concentric cylinders, so that when one of the concentric cylinders is rotated relative to the other, a variable fine resolution control-shutter effect is produced.

Scram safety control is provided with innermost poison (boron)-containing cylinder 110 (in front of the reactor) shown in FIG. 8. This scram cylinder may be actuated by a compression spring and/or a pneumatically drive piston contained in a cylinder that is recessed into the aft end of the hollow rotor shaft (not shown). This location of the actuator cylinder for the scram system enables if desired the incorporation of a short mechanical linkage to the nearby chemical fuel valves (not shown) of the pilot interburner 56; when scram cylinder 110 is shot into the reactor, the chemical fuel valves are opened to provide a flow of JP6 fuel and power from chemical burning to maintain rotor operation and to insure a continuous air supply to cool the reactor. This can of course be accomplished also by manual control of the operator. During take-off and at other times when both nuclear and chemical power are required, the fuel valves are opened independently from the operation of scram cylinder 110.

For shielding against radiation from the sides of reactor 18 the latter is surrounded with a concentric cylindrically shaped shield assembly 60 which is independently supported by the powerplant frame. Referring to FIG. 4b, it will be seen that shield assembly 60 is comprised of a side frame 120 consisting of an outer cylindrical wall 122 located inside a scroll 172 and an inner, concentric cylindrical wall 124 interconnected by a series of radial walls 126. Walls 126 are provided with a series of shoulders 128, 132 and 134 to accomodate circular segments 136, 138, 140 and 142 of shielding materials, such as beryllium. The bevelled edges of these segments permit non-uniform thermal growth in two directions. While not shown, sine wave leaf springs may be used in the spaces above the bevelled edges to retain these segments tightly in place. Immediately surrounding inner wall 124 are arc-shaped segments 144 of suitable fast neutron and gamma shield material such as copper. The remaining space between walls 122 and 124 is filled with rods 146 of BeO with axial holes 148. Hollow rods 146 are shaped on their sides to fit snugly side by side in the annular space provided. Within wall 124 is supporting structure for shorter segments 152, 154, 156 and 158 of the additional copper or tungsten shield material. It will be noted that circular segments 136-142 and 152-158 are supported in a spaced relationship.

Figure 10:
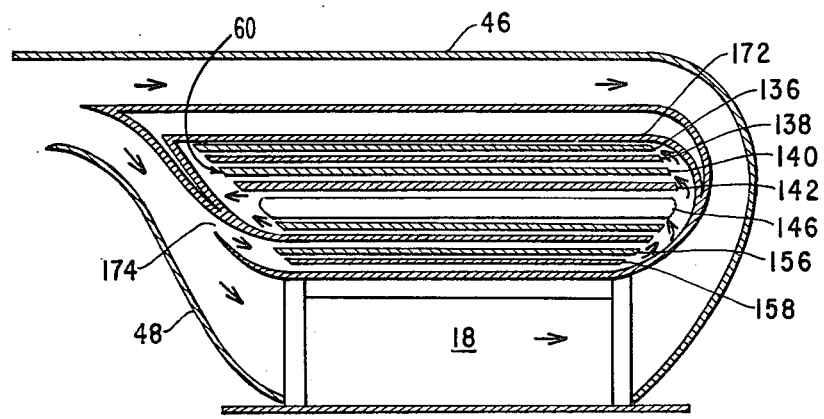
FIG. 10 is a schematic view along 10—10 of FIG. 4b.

In FIG. 10 is illustrated the cooling arrangement for the shielding construction just described. Reactor 18 is shown schematically with its end and annular reflecting regions included. Ducts 46 and 48 are shown delivering compressed air to both ends of reactor 18. The discharge ends of these ducts are radially aligned 60° apart between the front and rear ends of the reactor. Mounted in the annular space between reactor 18 and duct 46 is scroll 172 containing shielding assembly 60 just described. An opening 174 in front duct 48 permits some compressed air prior to heating to enter within scroll 172 to make two longitudinal passes through the spaces in the shielding construction described above. The flow of air takes place as indicated by the arrows. While not shown, the shield cooling air leaves scroll 172 at the front end of the shield assembly through the three annular sections that are in a radial alignment with the three turbine-flow-reactor compartments that pass hot turbine flow toward the front; the shield discharge air is then used to film-cool the walls of three transition ducts where the hot reactor discharge air is mixed with the cooler shield discharge flow prior to entry into the turbine.

While thrust at a high flight speed of Mach 3 for this nuclear system is in a performance range associated only with nuclear ramjets and the turbine operating temperature is less than required for a Mach 3 nuclear turbojet, this invention permits the increased high flight speed performance without a serious decrease in performance at low flight speeds, and booster requirements typical of nuclear ramjets are considerably reduced or completely eliminated with the use of a chemical pilot interburner as designed into the present concept. To achieve this high performance the cycle for this invention is arranged to obtain and apply more power from the reactor than is possible from a conventional arrangement that simply substitutes a a reactor for the chemical combustion system of a direct turbojet Brayton cycle. Contrary to a chemically-fueled turbojet Brayton cycle where increased power requires increased fuel flow, and where cycle performance is measureed by applied fuel-specific impulse (pounds of thrust per pound of fuel per second) and where increased power does not necessarily improve the fuel-specific impulse, any increase in power from the energy-abundant reactor can be applied (more or less efficiently) to improve the cycle performance (air-specific impulse) of a nuclear-fueled cycle for which the fuel-specific impulse is nearly infinite. Based on recognition of this fundamental difference between performance criteria for chemically-fueled and nuclear-fueled cycles, this invention affects a departure in cycle arrangement from a conventional direct nuclear turbojet Brayton cycle by employint in its cycle a reactor-heated partial bypass of the turbine. The turbine bypass is used to produce a high pressure source of airflow for efficient reactor heat transfer and to increase the applied reactor power. The high air pressure helps to overcome large heat exchanger fluid (airflow) pressure losses typically encountered in compact size propulsion reactors because the percentage of cycle pressure loss is reduced when higher fluid pressures are used for the same heat exchanger (reactor) design and operating parameters.

As all heat transfer propulsion reactors have considerable internal surface area and small size passageways that offer large impedance to flow, thus reducing the cycle pressure level and resulting in less than desirable pressure ratio across the exit nozzle, it becomes important to operate at high reactor pressure. Whereas for chemical turbojet engines a typical value of 4% pressure loss is experienced in the combustion system, 30% pressure loss is typical for reactors in nuclear propulsion systems. This relatively large pressure loss in air-breathing nuclear propulsion engines results in a correspondingly lower nozzle pressure ration and even a high discharge temperature produces small performance when nozzle pressure ratio is small. The present turbo-supercharged nuclear cycle operates to overcome the large reactor pressure losses and therefore makes available a larger nozzle pressure ratio (for which a central high-performance nozzle is provided in this invention).

If the entire turbine bypass part of the cycle is identified as a separate nuclear ramjet cycle, then higher performance is obtained in that part of the system than in typical nuclear ramjets because the separate ramjet cycle is supercharged (with the turbojet compressor). As described earlier, supercharging improves the reactor heat transfer and raises the air-specific impulse to a higher value (as though the system were at a higher flight speed). Hence, even at take-off, the inner or central nozzle yields a very large fraction of the total net thrust. In fact, the turbine bypass (or supercharged ramjet) part of the cycle produces most of the useful net thrust throughout the flight speed spectrum. While the air-specific impulse and thrust from the turbine discharge air-supplied outer concentric nozzle is smaller than it would be for a conventional direct cycle nuclear turbojet, the air is discharged from the inner nozzle at a considerably higher pressure and higher temperature (for the same reactor temperatures) and the inner nozzle performance is sufficiently excessive so that the combined effect enables high flight speed performance that is more typical of nuclear ramjets than of direct cycle nuclear turbojets.

It is thus seen that there has been provided a unique turbosupercharged nuclear power plant having many advanced features. An unusual reactor configuration permits the balancing of loads on the reactor itself and prevents the excessive buildup of stress arising out of thermal growth and loads introduced by air flow under high pressure and temperature. In addition a unique configuration for supporting the fueled tubes is provided which at the same time prevents the development of hot spots adjacent the reactor which would be detrimental to the supporting structure.

While only a preferred embodiment of this invention has been described it is understood that many changes may be made without departing from the spirit and scope of this invention which is to be defined only by the appended claims.

I claim:
1. Nuclear propulsion apparatus comprising:
   a. means for compressing incoming air;
   b. nuclear fission reactor means for heating said air;
   c. means for expanding a portion of the heated air to drive said compressing means;
   d. said nuclear fission reactor means being divided into a plurality of radially extending segments;
   e. means for directing a portion of the compressed air for heating through alternate segments of said reactor means and another portion of the compressed air for heating through the remaining segments of said reactor means; and
   f. means for further expanding the heated air from said drive means and the remaining heated air from said reactor means through nozzle means to effect reactive thrust on said apparatus.

2. The apparatus of claim 1 in which the partially expanded air from said drive means is further expanded through an annularly disposed thrust nozzle and the remaining heated air directly from said reactor means is expanded through a central thrust nozzle.

3. The apparatus of claim 2 in which the heated air for said drive means is derived from reactor means segments with air flow in one direction and the remaining heated air is derived from the remaining reactor means segments in the opposite direction.

4. The apparatus of claim 3 in which a portion of the compressed air prior to heating is mixed with heated air about to be expanded in said drive means.

5. Nuclear apparatus comprising:
   a. means for compressing incoming air;
   b. nuclear fission reactor means for heating said air;
   c. means for expanding a portion of the heated air to drive said compressing means;
   d. said nuclear fission reactor means being divided into a plurality of radially extending segments;
   e. means for directing a portion of the compressed air for heating in one direction through alternate segments of said reactor means and another portion of the compressed air in the opposite direction for heating through the remaining segments of said reactor means to balance fluid forces on said reactor means;
   f. means for further expanding the heated air from said drive means and the remaining heated air from said reactor means through nozzle means to effect reactive thrust on said apparatus;
   g. said nuclear fission reactor means being a right circular cylinder in shape with the cross sections of said segments being circular sectors; and
   h. pressure vessel means enclosing said segments to permit maintenance of circle arc geometry when the radius of said reactor means changes as a result of thermal growth.

6. The apparatus of claim 5 in which said pressure vessel means consists of multi-layered, thin-walled arc-shaped wall sections at the periphery of each reactor segment and resilient joint means located at adjoining reactor segments to interconnect adjoining wall sections.

7. The apparatus of claim 6 in which the fuel for said reactor means consists of tube-like elements extending parallel to the axis of said reactor means and in the direction of air flow through each said segment.

8. The apparatus of claim 7 in which the downstream end of each segment is provided with means to support said fuel elements against movement caused by fluid pressure.

9. The apparatus of claim 8 in which said support means includes a grid-like lattice structure and means to cool said structure and prevent overheating of the reactor end support structure.

10. The apparatus of claim 9 having air-cooled shielding means surrounding said pressure vessel means.

11. The apparatus of claim 5 in which said reactor means is provided with a hollow hub and means within said hub for exercising control over the reactivity of said reactor means.

12. The apparatus of claim 5 having means for directing air flow as aforesaid, said ducting means performing the additional function of providing some shielding for said reactor means.

* * * * *